US008584480B1

(12) United States Patent
Butkus

(10) Patent No.: US 8,584,480 B1
(45) Date of Patent: Nov. 19, 2013

(54) ADAPTABLE WATER HARVESTING APPARATUS

(75) Inventor: Michael A. Butkus, Washingtonville, NY (US)

(73) Assignee: The United States of America, as Represented by the Secretary of the Army, Washington, DC (US)

( * ) Notice: Subject to any disclaimer, the term of this patent is extended or adjusted under 35 U.S.C. 154(b) by 1196 days.

(21) Appl. No.: 12/380,749

(22) Filed: Mar. 4, 2009

(51) Int. Cl.
*F25D 21/14* (2006.01)

(52) U.S. Cl.
USPC ........................................................... 62/285

(58) Field of Classification Search
USPC .................................... 62/285, 93, 236, 235.1
See application file for complete search history.

(56) References Cited

U.S. PATENT DOCUMENTS

| 2,546,912 | A | * | 3/1951 | Sutton | 62/435 |
| 5,035,117 | A | * | 7/1991 | Drake | 62/79 |
| 6,828,499 | B2 | * | 12/2004 | Max | 136/246 |

* cited by examiner

*Primary Examiner* — Melvin Jones
(74) *Attorney, Agent, or Firm* — U.S. Department of the Army; Kristin Kohler

(57) ABSTRACT

A water harvesting apparatus includes a condenser system and an absorption refrigerator connected to the condenser system. The condenser system has a condenser for condensing water from ambient air. The absorption refrigerator cools the condenser, and derives its heat from waste heat. A method of harvesting water from the air includes the steps of introducing ambient air to a condenser system which has a condenser for condensing water from air, supplying waste heat to an absorption refrigerator to cool a refrigerant, transferring the cooled refrigerant to the condenser to the cool the condenser, and condensing water from ambient air.

20 Claims, 1 Drawing Sheet

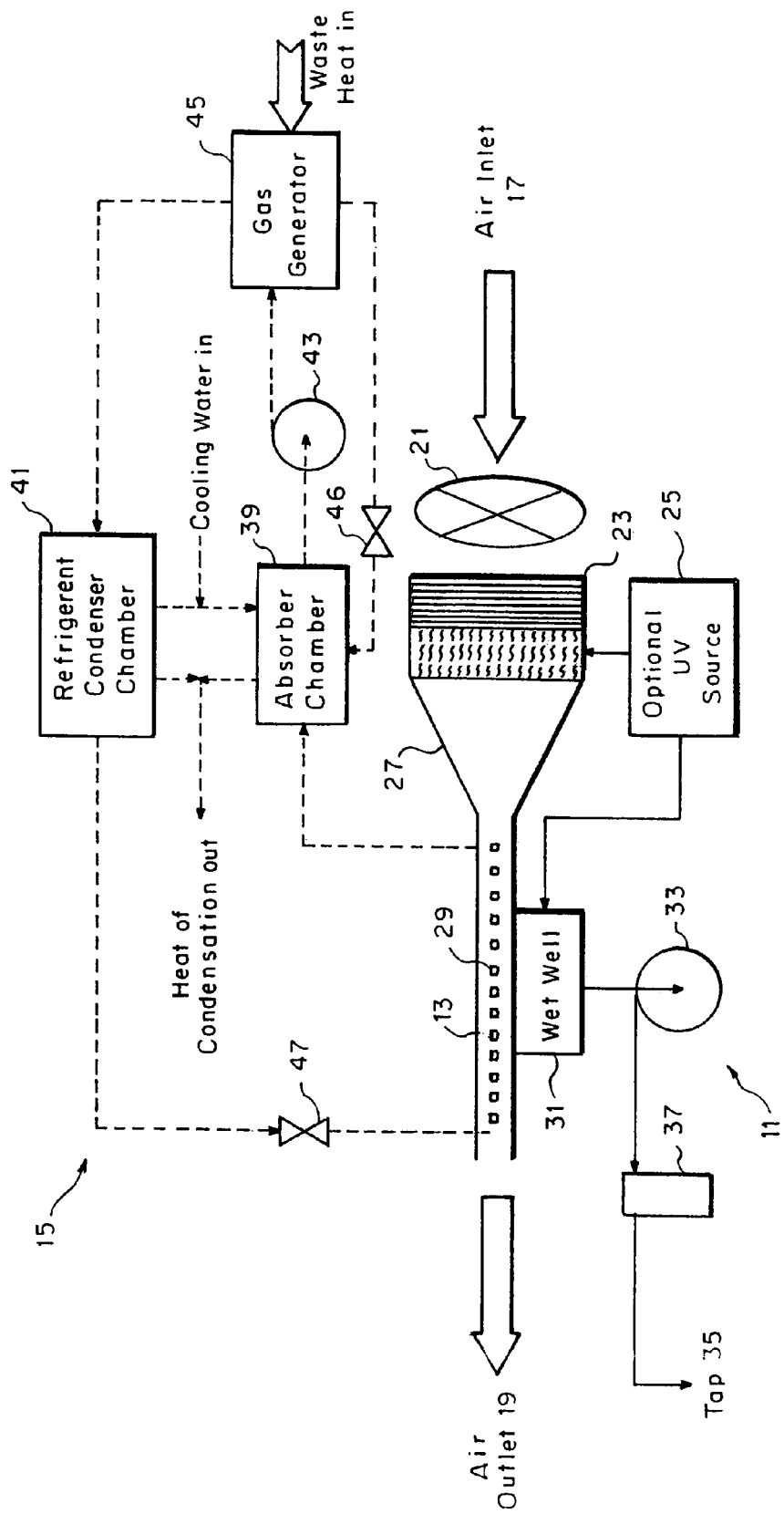

ADAPTABLE WATER HARVESTING APPARATUS

BACKGROUND OF THE INVENTION

This invention relates in general to water production, and more particularly to producing potable water.

Although vast improvements have been made in modern times in obtaining suitable quantities of potable water, problems still exist for people temporarily located in places remote from settled communities. This is particularly true for researchers working in the field as well as military encampments. Currently, the methods of providing potable water in the field typically include shipping in bottled water, using existing water treatment infrastructure or constructing a small conventional water treatment plant, using a reverse osmosis treatment, or using a chemical treatment method and/or apparatus. Each of these treatment methods presents a variety of problems. For example, the source of bottled water may call into question the quality of the water. Transporting large volumes of water is logistically undesirable, requiring additional vehicles, fuel and manpower, and may put soldiers at risk when transporting water through unfriendly areas.

Depending upon location, in some instances it may be feasible to use a local water treatment plant. However, such use may be limited by the quality of the water that can be produced by the plant and whether the facilities are susceptible to sabotage and intentional contamination.

High quality water can be produced in both small and large scale procedures using a reverse osmosis system. Such water treatment procedures, however, require that the system be situated near a water source. In addition, such systems are energy intensive and the membranes, which have finite lifetimes, are expensive to replace.

Numerous point of use devices (such as a canteen, a hydration pack or a portable water purifier) are currently available that can supply a sufficient amount of water for one or several people. These devices have limitations such as requiring a source of water and in many cases a chemical treatment agent, such as a halogen treatment agent, typically an iodine tablet. Most of these devices are capable of providing limited amounts of potable water batch wise. In addition, these commonly used devices are not effective against all possible contaminants.

SUMMARY OF THE INVENTION

Accordingly, it is an object of the invention to supply potable drinking water.

This and other objects of the invention are achieved in one aspect by a water harvesting apparatus having a condenser system including a condenser for condensing water from ambient air, and an absorption refrigerator connected to the condenser system for cooling the condenser, the absorption refrigerator deriving its heat from waste heat.

Another aspect of the invention involves a method of harvesting water from the air that includes introducing ambient air to a condenser system having a condenser for condensing water from air, providing waste heat to an absorption refrigerator to cool a refrigerant, transferring the cooled refrigerant to the condenser to the cool the condenser, and condensing water from ambient air.

Only in the realm of theoretical physics where isolated systems in equilibrium are considered can the total interconversion of one form of energy to another single form of energy take place with an efficiency approaching 100%. Heat is often a byproduct form of energy when most mechanical devices are used, and this is particularly true of internal combustion engines. Typically the byproduct heat produced in the operation of many of these devices is unwanted and in many situations the heat produced may be detrimental to the device itself or to the environment. This unwanted heat, referred to herein as "waste heat" and sometimes identified in the Second Law of Thermodynamics by the same term, is produced as the byproduct of mechanical, electrical or electromechanical processes Such waste heat is scavenged in the invention which is capable of producing potable drinking water at almost any inhabitable location on Earth. The invention uses an absorption-refrigeration cycle and associated apparatus in combination with a condenser system to remove water from air. The majority of energy required to power the absorption-refrigeration cycle is derived from waste-heat and all of the thermal energy required to vaporize refrigerant in the absorption-refrigeration cycle may be supplied by waste heat. Any piece of equipment that produces waste-heat can be coupled with the water production device. As an example, when the invention is coupled with a generator-set, water and electricity can be produced with one unit. It is estimated that this invention can produce 7,000 Gal/day of potable water (basic water needs for 550 troops) with the waste-heat produced from one 840 kW generator-set (a generator-set used by the US Army in the field).

Additional advantages and features will become apparent as the subject invention becomes better understood by reference to the following detailed description when considered in conjunction with the accompanying drawings wherein:

BRIEF DESCRIPTION OF THE DRAWINGS

The sole FIGURE shows the water harvesting apparatus in accordance with the invention.

DETAILED DESCRIPTION

Referring to the FIGURE, the water harvesting apparatus includes a condenser system 11 having a condenser 13 for condensing water from ambient air, and an absorption refrigerator 15 connected to the condenser system for cooling the condenser.

The condenser system 11 includes an air inlet 17 and an air outlet 19. A fan 21 is disposed at the air inlet 17 to draw ambient air into the condenser 13. The air may also be introduced into the condenser 13 by density driven flow (without fan). Although the fan 21 is shown placed at the entrance to the condenser system 11, arranged to blow ambient air into the system, the fan may be placed at the air outlet 19 at the downstream end of the condenser system 11 so that it draws air through the system. Ambient air entering the system 11 is thereafter preferably pretreated with a means for particulate removal 23, such as a particulate filter or particulate absorber, but may alternatively include a bag-house, or cyclone. The filtered air may then be conducted past a UV radiation source 25, optionally provided to be used as a disinfecting means in situations where there is concern that there may be an unusually high concentration of airborne pathogens in the area. The air is then conducted to a contracted portion of a housing 27 that forms the condenser's throat and contains the condenser's cooling coils 29 wherein the air passes over the coils. As the air is cooled by the condenser 13, water condenses on the coils 29. The cooling coils may be coated with a hydrophilic, high thermal conductivity polymer composite to increase the efficiency of the phase change process. The condensate is collected in a wet well 31. Condensate in the condenser 13 throat and the wet well 31 may optionally be disinfected with the UV radiation source 25 that may be used if the apparatus has not been adequately disinfected between uses. The polymer, if one is used to coat the condenser coils 29, can also be impregnated with a disinfectant (e.g. silver) to enhance inactivation of microbes. Condensate is optionally transferred by a pump 33 from the wet well 31, to a tap 35 through some means to remove any remaining nuclear, biological, or chemical contaminants, such as a nuclear, biological, and chemical (NBC) filter and/or ultrafiltration membrane 37. This water can then be further disinfected (with one or a combination of disinfectant(s) e.g. salt electrolysis, iodine, silver, ozone, chlorine, UV radiation, gamma radiation, chlorine dioxide, etc.).

Although all of the disinfection means and agents mentioned above are optional, it is preferred that at least one means or agent be used. Where it is desirable to use a UV source in more than one location, and where it is possible to do so, the elements of the condenser system 11 may be so arranged that a single UV source may used to provide radiation to several sites.

Turning now to the absorption refrigerator, the absorption-refrigeration cycle (identified in the FIGURE by dotted lines) can work with any evaporating refrigerant. Preferred is a water-lithium bromide ($H_2O$—LiBr) system because it will operate with waste-heat fluids at temperatures less than 100° C., which corresponds to internal combustion engine coolant temperatures. Another advantage to using a salt absorber (eg. LiBr) over a liquid absorber (e.g. $H_2O$) is that the solid absorber will not evaporate in the gas generator, which results in a higher efficiency. The refrigerant (e.g. water) is first dissolved in the absorbent (e.g. LiBr) in an absorber chamber 39. Cooling water used to prepare the refrigerant and to remove the latent heat of vaporization may be supplied to the absorber chamber 39 from the condenser coils 29 or a refrigerant condenser chamber 41 (discussed below). Stored potable water may also be sufficient for this application. The solution is then transferred with a pump 43 to a gas generator 45 where the refrigerant is vaporized at higher pressure and elevated temperature since, by design, bulk boiling of absorbent does not occur under these thermodynamic conditions. A valve 46 is provided to control the flow of absorbent that is returned to the absorber chamber 39.

The majority of energy needed to vaporize the refrigerant is derived from waste-heat provided to the gas generator 45. This is a significant advantage over conventional refrigeration systems that use compressors, which have a relatively large mechanical energy demand. The purified high pressure refrigerant vapor is then transferred to the refrigerant condenser chamber 41 and then passed through an expansion valve 47 that converts the refrigerant from a high pressure liquid to a low pressure, low temperature liquid-vapor mixture. A heat sink, such as ambient air or cooling water, is required for the refrigerant condenser chamber 41. The liquid-vapor mixture is used to absorb heat in the condenser coils 29 of the condenser system and condense water vapor from the surrounding air. A control system can be used to adjust the air flow rate to prevent the removal of excess sensible heat (i.e., the heat necessary to increase or decrease temperature) from the water thereby maximizing process efficiency and setting potable water temperature.

A variety of sources as well as various methods may be used to conduct waste heat from a source to the gas generator 45. Basically any source of waste heat may be used to supply sufficient heat to vaporize the refrigerant in the gas generator. Preferred, however, is any machinery that normally would be used at the same location as the water harvesting apparatus. Since an electrical generator may typically be present, such a device is preferred. The waste heat may be transferred from the source of the waste heat to the gas generator 45 by any suitable means. This might include something as simple as insulated shrouds around the source of the waste heat and the gas generator and a conduit possibly containing a fan communicating between the shrouds. However, where possible, it is preferable to pass a fluid heated by the waste heat source through a conduit, such as a coil, that is inserted into the refrigerant contained in the gas generator 45. With apparatus such as diesel powered, liquid cooled generators, this would be easy to accomplish. This may be done by transferring the coolant fluid using a coolant pump on a diesel generator or by natural circulation.

It is obvious that many modifications and variations of the present invention are possible in light of the above teachings. It is, therefore, to be understood that within the scope of the appended claims, the invention may be practiced other than as described.

What is claimed as new and desired to be secured by Letters Patent of the United State is:

1. A water harvesting apparatus comprising:
a condenser system including a condenser for condensing water from ambient air; and
an absorption refrigerator connected to the condenser system for cooling the condenser for condensing water from ambient air, the absorption refrigerator deriving its heat from waste heat, wherein the absorption refrigerator includes a condenser for condensing gas from a refrigerant gas.

2. The water harvesting apparatus according to claim 1 wherein the absorption refrigerator is capable of cooling the condenser for condensing water from ambient air sufficiently to condense water from ambient air.

3. The water harvesting apparatus according to claim 1 wherein the condenser system includes an air inlet, an air outlet, and a fan disposed at the air inlet to draw ambient air into the condenser for condensing water from ambient air.

4. The water harvesting apparatus according to claim 3 wherein the condenser system includes means for particulate removal disposed downstream from the air inlet.

5. The water harvesting apparatus according to claim 4 wherein the means for particulate removal is a particulate filter.

6. The water harvesting apparatus according to claim 4 wherein the means for particulate removal is a cyclone.

7. The water harvesting apparatus according to claim 4 wherein the means for particulate removal is a baghouse.

8. The water harvesting apparatus according to claim 1 wherein the condenser system includes a UV radiation source disposed downstream of the condenser for condensing water from ambient air to disinfect condensed water.

9. The water harvesting apparatus according to claim 1 wherein the condenser system includes nuclear, biological and chemical filtration means disposed downstream of the condenser for condensing water from ambient air.

10. The water harvesting apparatus according to claim 9 wherein the condenser system includes supplemental disinfection means disposed downstream of the condenser for condensing water from ambient air for disinfecting condensed and filtered water.

11. The water harvesting apparatus according to claim 1 wherein the absorption refrigerator includes an absorber chamber for holding a solution of a refrigerant and an absorber.

12. The water harvesting apparatus according to claim 11 wherein the absorption refrigerator includes a gas generator operatively connected to the absorber chamber for generating a gas from a solution of a refrigerant and an absorber.

13. The water harvesting apparatus according to claim 12 wherein the gas generator derives heat necessary for vaporization of the refrigerant from waste heat.

14. The water harvesting apparatus according to claim 13 wherein the absorption refrigerator includes a pump for transferring a solution of a refrigerant and an absorber from the absorber chamber to the gas generator.

15. The water harvesting apparatus according to claim 14 wherein the condenser for condensing gas from a refrigerant gas condenses the refrigerant gas that has been vaporized by the gas generator.

16. The water harvesting apparatus according to claim 15 wherein the absorption refrigerator includes an expansion valve for converting the high pressure liquid to a low pressure, low temperature liquid-vapor mixture to absorb heat in the condenser system.

17. A water harvesting apparatus comprising:
a condenser system including a condenser for condensing water from ambient air; and an absorption refrigerator connected to the condenser system for cooling the condenser the absorption refrigerator deriving its heat from waste heat,
wherein the condenser system includes an air inlet, an air outlet and a fan disposed at the air inlet to draw ambient air into the condenser, and
wherein the absorption refrigerator includes an absorber chamber for holding a solution of a refrigerant and an absorber, is gas generator operatively connected to the absorber chamber for generating a gas from a solution of a refrigerant and an absorber, the gas generator deriving heat necessary for vaporization of the refrigerant from waste-heat, a pump for transferring a solution of a refrigerant and an absorber from the absorber chamber to the gas generator, a condenser for condensing the gas from refrigerant solution that has been vaporized by the gas generator to a high pressure liquid, and an expansion valve for converting the high pressure liquid to a low pressure, low temperature liquid-vapor mixture to absorb heat in the condenser system.

18. A method of harvesting water from ambient air comprising the steps of:
introducing ambient air to a condenser system, the condenser system including a condenser for condensing water from ambient air;
providing waste heat to an absorption refrigerator to cool a refrigerant;
transferring the cooled refrigerant to the condenser to cool the condenser for condensing water from ambient air; and
condensing water from the ambient air.

19. The method according to claim 18 including the step of removing particulates from the ambient air.

20. The method according to claim 19 including the steps of disinfecting the ambient air.

* * * * *